(12) United States Patent
Maguire

(10) Patent No.: US 7,112,156 B2
(45) Date of Patent: Sep. 26, 2006

(54) TRANSMISSION WITH MINIATURE MOTOR FOR CONTROL TO OIL FLOW

(75) Inventor: Joel M. Maguire, Northville, MI (US)

(73) Assignee: General Motors Corporation, Detroit, MI (US)

( * ) Notice: Subject to any disclaimer, the term of this patent is extended or adjusted under 35 U.S.C. 154(b) by 198 days.

(21) Appl. No.: 10/786,638

(22) Filed: Feb. 25, 2004

(65) Prior Publication Data

US 2005/0183541 A1    Aug. 25, 2005

(51) Int. Cl.
*F16H 31/00*    (2006.01)

(52) U.S. Cl. ............ 475/145; 475/127; 475/138; 475/146

(58) Field of Classification Search ........... 475/127, 475/138, 145, 146; 137/596.16, 596.17
See application file for complete search history.

(56) References Cited

U.S. PATENT DOCUMENTS 5,970,998 A * 10/1999 Talbot et al. ............. 137/1
6,334,462 B1 * 1/2002 Dore et al. ............ 137/625.65
6,494,804 B1 * 12/2002 Hunnicutt et al. .......... 475/127

* cited by examiner

*Primary Examiner*—Ha Ho
(74) *Attorney, Agent, or Firm*—Christopher DeVries

(57) ABSTRACT

A transmission includes a plurality of fluid passages configured to transmit fluid through the transmission for operating the transmission. A miniature electric motor is operatively connected to a moveable blocker positioned in one of the passages for actuating movement of the blocker between an open position in which fluid is allowed to flow through the passage, and a closed position in which the passage is blocked.

8 Claims, 2 Drawing Sheets

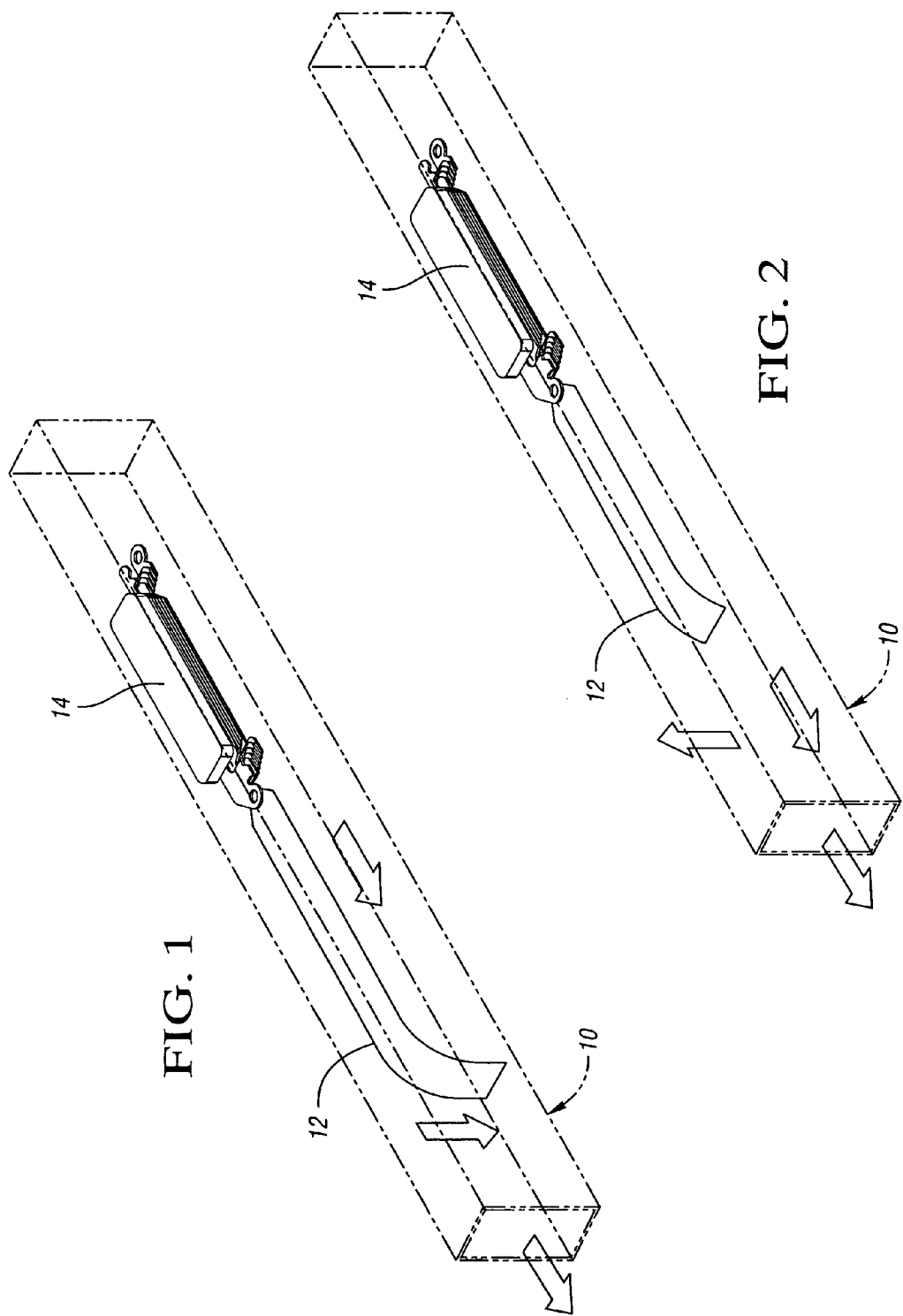

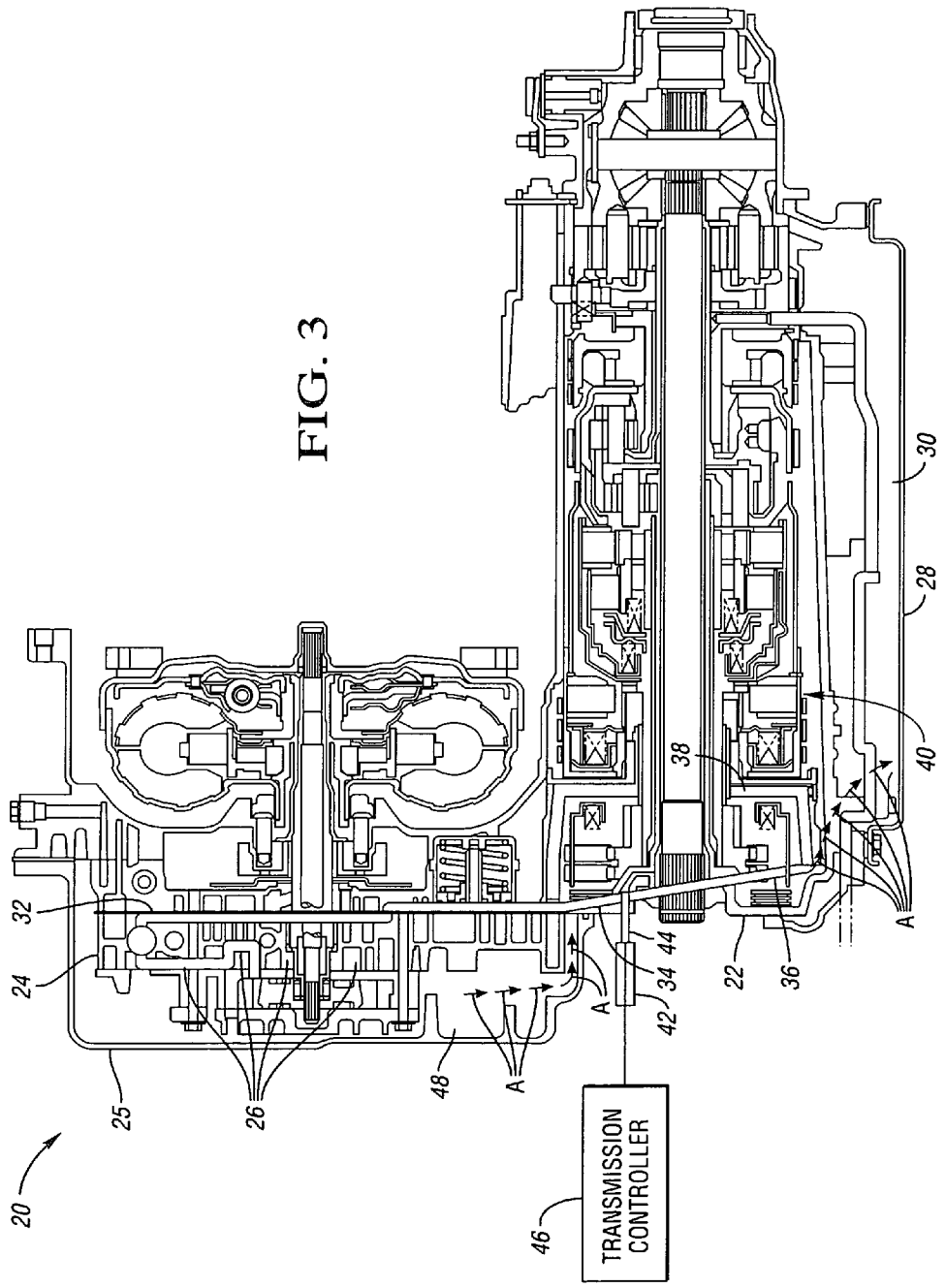

TRANSMISSION WITH MINIATURE MOTOR FOR CONTROL TO OIL FLOW

TECHNICAL FIELD

The present invention relates to a transmission having a miniature motor positioned to control oil flow within the transmission in a manner to reduce spin losses.

BACKGROUND OF THE INVENTION

The flow of oil within a transmission is controlled in a manner to lubricate the moving components and to apply clutches when needed. Transmissions often include a case side cover pan having an oil chamber which stores oil that may be selectively delivered to an oil sump to provide desired levels of oil within the transmission. If the oil sump level is unnecessarily high, then the oil may interfere with the rotating components of the transmission as a result of the paddlewheel effect of the moving components rotating through the oil, or the viscous coupling effect of the oil on the rotating components. This interference causes spin losses which translate directly into reduced fuel economy.

The flow of oil from the oil chamber of the case side cover pan into the oil sump is typically controlled by a thermostatic element which is operative to reduce the flow of oil when the oil is above a predetermined temperature level. The thermostatic element contains a temperature sensitive strip of metal that reacts to fluid temperature changes to open or close a fluid passage. At low temperatures, the thermostatic element exerts little pressure on the thermostatic element plate, which allows fluid to drain into the sump. As the temperature of the fluid rises, the thermostatic element begins to apply pressure to the thermostatic element plate, thereby trapping fluid in the case side cover pan. This control is needed to maintain the operation of the hydraulic system. The thermostatic control element provides a passive control which may not be adjusted based upon operating conditions of the transmission or vehicle.

SUMMARY OF THE INVENTION

The invention provides an active oil level control by providing a miniature motor operatively associated with a blocker or valve in a fluid passage to selectively prevent the flow of oil from an oil chamber in a case side cover pan into an oil sump. The motor may be connected to a transmission controller for dynamic adjustments to deliver optimal oil levels to the transmission while reducing spin losses and improving maneuverability of the transmission, such as an enabling higher acceleration in turns without uncovering the pump oil inlet.

The invention also provides the opportunity for active lubrication control. By providing a blocker in a fluid passage between the valve body and a spinning component of the transmission, the delivery of fluid to the spinning component during operation may be actively controlled to provide reduced spin loss by limiting the flow of fluid to open clutches, and improved durability by delivering extra flow of fluid to critical areas during abusive operating conditions.

Accordingly, the invention provides a transmission having a plurality of fluid passages configured to transmit fluid through the transmission for operating the transmission. A miniature electric motor is operatively connected to a moveable blocker positioned in one of the passages for actuating movement of the blocker between an open position in which fluid is allowed to flow through the passage, and a closed position in which the passage is blocked.

In one embodiment, the blocker is operatively positioned between an oil chamber and an oil sump to control the amount of fluid flowing from the oil chamber to the oil sump. In another embodiment, the blocker is operatively positioned between a valve body channel and a clutch for controlling the amount of fluid flowing to the clutch.

The miniature motor may be positioned in the passage with the blocker and bathed in the fluid. Preferably, the miniature motor is small enough to fit within a typical transmission fluid passage. A preferred dimension would be less than 5 millimeters in width and less than 10 millimeters in length. The miniature motor is preferably characterized by the absence of an armature and windings, and the motor may be linear or rotary.

The invention also provides a method of reducing spin losses in a transmission including the steps of:

a. providing a miniature electric motor connected to a blocker in a fluid passage in the transmission; and b. selectively actuating the miniature electric motor to move the blocker to block the passage, thereby reducing the amount of oil engaging spinning components of the transmission to reduce spin losses.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 1 shows a schematic perspective view of a miniature motor in a transmission passage in accordance with the present invention, with the passage blocked;

FIG. 2 shows a schematic perspective view of the motor and passage of FIG. 1, with the passage open; and FIG. 3 shows a schematic sectional view of a transmission including a miniature motor to illustrate two embodiments of the invention.

DESCRIPTION OF THE PREFERRED EMBODIMENTS

The invention uses a miniature electric motor to open and close low pressure oil flow to critical areas of a transmission for improved fuel economy. The miniature motor will be attached to a blocker or valve that will open or close an oil passage. The electric motor is controlled by a transmission electronic controller.

It is desirable to control the low pressure oil flow within the transmission to minimize spin losses within the transmission. A typical area for controlled lubrication would be a situation in which clutches are open and components are rotating at a relatively high speed. The lubrication could be controlled and tailored to deliver the minimum spin loss. Oil level control can also be achieved by the use of miniature motors in the fluid passages. Oil level changes within a transmission due to thermal expansion. Additional oil volume may be stored in areas other than the transmission sump. The stored oil must return to the sump in order to cover the pump inlet under certain vehicle maneuvers. Active control of the oil returning to the sump via the electric motor and blocker will enable active control of the amount of oil returning to the sump to accommodate for vehicle maneuvers without providing unnecessarily high volume of oil that would cause the oil level to rise and contact rotating parts, thereby causing additional spin losses.

Alternatively, flow to a vehicle cooler could be redirected or blocked to actively enable optimum warm up of the transmission to reduce spin losses.

FIGS. 1 and 2 show schematic perspective views of a fluid passage 10 in a transmission having a moveable blocker 12 which is moveable between a closed position blocking the passage 10, as shown in FIG. 1, and an open position in which fluid may flow through the passage 10 as shown in FIG. 2. The blocker 12 is operatively connected to the miniature motor 14 to selectively actuate movement of the blocker 12 between the open and closed positions.

The miniature motor 14 is preferably a linear or rotary motor which is less than 5 millimeters in width and less than 10 millimeters in length. These miniature motors are available, perhaps with modification, from various suppliers, such as Nanomuscle, Inc. of Antioch, Calif.; Kleindiek Nanotechnik of Reutlingen, Germany; or Klocke Nanotechnik of Aachen, Germany.

The miniature motor may be an electrostatic motor which implements nanotechnology, such as nanotubes, for actuation. Alternatively, a piezoelectric device may be used. Piezoelectricity is the phenomenon by which certain crystals release an electrical current when being deformed by physical pressure from the outside. The opposite is also true. These crystals will change shape when an electric current is fed through them. Certain miniature motors may apply this technology effectively.

Preferably, the miniature motor is characterized by the absence of an armature and windings, and is capable of bathing in the transmission fluid without adversely affecting operation.

Turning to FIG. 3, a schematic illustration of two embodiments of the invention is shown. The two embodiments illustrated may not necessarily be implemented together in a single transmission. As illustrated, the transmission 20 includes a transmission case 22, and a valve body 24 is mounted within in case 22. The valve body 24 includes a plurality of fluid passages 26 configured to transmit fluid to various components of the transmission for operating the transmission. An oil pan 28 is connected to the bottom of the transmission 20 to form an oil sump 30. As shown, the fluid passage 32 directs fluid from the valve body 24 to the passages 34, 36, 38, which deliver the fluid to the clutch 40 for selectively apply the clutch 40. In one embodiment, the miniature motor 42 is shown schematically having a blocker 44 which may be selectively extended across the passage 34 for blocking the passage to stop flow of fluid to the clutch 40. Closure of the passage may be needed, for example, when the clutch 40 is open and the transmission is operating at high speed to minimize spin losses associated with the clutch 40. As shown, the miniature motor 42 is operatively connected to the transmission controller 46 so that the miniature motor 42 and blocker 44 may be actively controlled based upon current vehicle operating conditions, and based upon current operating conditions of the transmission 20.

FIG. 3 also illustrates another embodiment of the invention wherein the flow of oil between the oil chamber 48 in the case side cover pan 25 to the sump 30 may be actively controlled. The flow of oil is illustrated by the arrows A. By way of example, the oil from the oil chamber 48 may follow the arrows A through the passages 34, 36 into the oil sump 30. Again, the passage 34 may be blocked by movement of the blocker 44 by actuation of the miniature motor 42, as shown schematically in FIG. 3, to prevent the flow of oil from the oil chamber 48 into the oil sump 30. In this manner, the level of oil within the oil sump 30 may be prevented from rising to a level in which the rotating components of the transmission 20 would contact the oil, resulting in spin losses. Accordingly, the oil level of the sump 30 can be adjusted dynamically to optimize the oil level to reduce spin losses, thereby improving fuel economy, and improving maneuverability. With the improved maneuverability, higher acceleration may be achieved in vehicle turns without uncovering the pump oil inlet.

The various embodiments of the invention shown and described herein may be combined within the scope of the present invention. While the best modes for carrying out the invention have been described in detail, those familiar with the art to which this invention relates will recognize various alternative designs and embodiments for practicing the invention within the scope of the appended claims.

The invention claimed is:

1. A transmission comprising:
   a clutch;
   a valve body;
   a plurality of fluid passages configured to transmit fluid through the transmission for operating the transmission, wherein said plurality of fluid passages further comprises at least one additional passage located external to said valve body, and wherein said at least one additional passage is operatively connected between said valve body and said clutch to thereby direct oil flow between said valve body and said clutch; and
   a miniature electric motor operatively connected to a moveable blocker positioned in said at least one additional passage for actuating movement of the blocker between an open position in which fluid is allowed to flow through the additional passage, and a closed position in which the additional passage is blocked.

2. The transmission of claim 1, wherein the blocker is operatively positioned between an oil chamber and an oil sump to control the amount of fluid flowing from the oil chamber to the oil sump.

3. The transmission of claim 1, wherein said miniature motor is operatively connected to a transmission controller.

4. The transmission of claim 1, wherein the blocker is operatively positioned between a valve body channel and a clutch for controlling the amount of fluid flowing to the clutch.

5. The transmission of claim 1, wherein the miniature motor is positioned in one of the passages and bathed in the fluid.

6. The transmission of claim 1, wherein the miniature motor is less than 5 millimeters in width and less than 10 millimeters in length.

7. The transmission of claim 1, wherein the miniature motor is characterized by the absence of an armature and windings.

8. A transmission comprising:
   a plurality of fluid passages configured to transmit fluid through the transmission for operating the transmission;
   a miniature electric motor operatively connected to a moveable blocker positioned in one of said passages for actuating movement of the blocker between an open position in which fluid is allowed to flow through the passage, and a closed position in which the passage is blocked;
   wherein the miniature motor is positioned in said one of the passages and bathed in the fluid;
   wherein the miniature motor is operatively connected to a transmission controller; and
   wherein the miniature motor is less than 5 millimeters in width and less than 10 millimeters in length.

\* \* \* \* \*